United States Patent [19]

Bond, Jr.

[11] Patent Number: 4,762,000

[45] Date of Patent: Aug. 9, 1988

[54] FLUID LEVEL INDICATING APPARATUS

[76] Inventor: Charles R. Bond, Jr., 2241 Boston, SE., Grand Rapids, Mich. 49506

[21] Appl. No.: 915,766

[22] Filed: Oct. 6, 1986

[51] Int. Cl.[4] .............................................. G01F 23/00
[52] U.S. Cl. .................................. 73/290 R; 116/227; 116/313
[58] Field of Search ............... 116/227, 303, 305, 306, 116/307, 311, 313, 294; 33/126.4 R, 126.7 R; 73/290 R, 290 B, 297, 302, 303; 220/212; 137/556

[56] References Cited

U.S. PATENT DOCUMENTS

| 4972 | 2/1847 | Baker | 73/290 R |
|---|---|---|---|
| 807,574 | 8/1903 | McIntire | 200/33 R |
| 1,521,195 | 12/1924 | Johnson | 73/209 R |
| 1,526,376 | 2/1925 | Rosenmund | 73/290 R |
| 1,526,377 | 2/1925 | Rosenmund | 73/290 R |
| 1,647,874 | 11/1927 | Manning | 220/212 |
| 1,830,116 | 11/1931 | Kruft | 33/126.4 R |
| 2,618,975 | 11/1952 | St. Clair | 73/298 |
| 3,667,295 | 6/1972 | Skutella | 73/290 R |
| 3,981,324 | 9/1976 | Waring | 137/556.6 |
| 4,141,310 | 2/1979 | Rich, Jr. | 33/293 |
| 4,531,293 | 7/1985 | Grinde | 33/126.7 R |

FOREIGN PATENT DOCUMENTS 2571122   4/1986   France ............................. 220/212

Primary Examiner—William A. Cuchlinski, Jr.
Assistant Examiner—W. Morris Worth
Attorney, Agent, or Firm—Varnum, Riddering, Schmidt & Howlett

[57] ABSTRACT

A fluid level indicating apparatus includes a piston and cylinder assembly which is located adjacent the surface of a body of fluid contained within fluid reservoir and includes openings to admit such fluid thereinto with the piston in one extreme axial position, and to vent air from the cylinder but restrict fluid flow therefrom during movement of the piston from the extreme axial position. The piston is connected by a link to a pivotally mounted level indicating plate which pivots in conjunction with pivotal movement of an actuator element (e.g. the hinged cap of the fluid reservoir closure) to a position indicating the level of fluid in the reservoir. The actuator element is releasably connected to the indicator plate in a manner to cooperate with the restriction of fluid flow from the cylinder upon piston movement to position the indicator plate at an appropriate level indicating position for any given fluid level within the indicating range of the apparatus.

12 Claims, 2 Drawing Sheets

FLUID LEVEL INDICATING APPARATUS

TECHNICAL FIELD

This invention relates to fluid level indicating systems such as engine crank case oil level indicators.

BACKGROUND ART

In numerous mechanical systems having fluid reservoirs, there has been a continuing need for economical, convenient and reliable indicating systems to indicate the fluid level in such reservoirs. For example, in automobile engines and other internal combustion engines requiring a continuous circulation of lubricating fluid such as oil, indicator systems have been necessary to measure and indicate the oil level in the engine crankcase for the usual purpose of operational maintenance. Without such an indicating system, the operator would have no convenient way of ascertaining when to add oil to keep the crank case oil level at a suitable operating level or how much oil to add.

The most common such indicating system in use today is the well-known dip stick which is employed universally by the automobile industry. Other more sophisticated remote indicating systems have been used on special purpose automobiles such as race cars and other specialty engines of high value. For example, one such indicating system is similar to the standard automobile fuel level measuring system which consists of a float assembly, an electrical position sensor to sense the position of the float, and an electrically actuated dashboard meter to indicate oil level.

In general, the dip stick, although effective, is also inconvenient because it requires locating the dip stick handle amongst the clutter of a tightly packed engine compartment, pulling the dip stick entirely out of its sleeve to wipe splashed oil off of it, finding the open end of the sleeve to reinsert the dip stick, (which usually requires holding on to the long hot and oily end of the dip stick), again pulling the dip stick out, and then trying to read the often confusing oil splotches on the dip stick with reference to the oil level indicia thereon. This procedure is dirty, cumbersome and often intimidating to many people. As a result, frequent checks of crankcase oil level often may be neglected to the detriment of engine maintenance requirements. Alternative types of systems such as the float assembly and remote indicating meter characterized above usually have been considered uneconomical for use on most automobiles, especially since road automobiles are not driven at the limits of performance and continuous monitoring of crankcase oil level therefore is not necessary.

Other fluid level indicating systems are also known in the prior art. For example, U.S. Pat. No. 1,526,376, issued Feb. 17, 1925 to Rosenmund, discloses a liquid level indicator for measuring the oil within the crankcase of an automobile engine, according to which the pulling up of a handle indicates the height or level of oil in the crank case. In the Rosenmund structure, a float valve is actuated by movement of the actuator handle to close off an orifice and thereby confine a volume of oil within a portion of a vertical tube that is connected to the crankcase. One might analogize Rosenmund as a device for mechanical "reading" of the oil level in an otherwise well known sight glass.

U.S. Pat. No. 1,830,116, issued Nov. 3, 1931 to Kruft, discloses a liquid level gauge which utilizes the differential cross-sectional areas of a pair of connected tubular elements, and the differential displacement of oil therein, to move an indicator pointer with respect to an indicia-bearing plate, to thereby indicate liquid level.

U.S. Pat. Nos. 3,981,324, issued Sept. 21, 1976 to Wearing, and 2,618,975 issued Nov. 25, 1952 to St. Chair, disclose other types of level gauges, and U.S. Pat. No. 4,141,310, issued Feb. 27, 1979 to Rich, Jr., discloses an apparatus for indicating the desired finish level of a poured (e.g. concrete) floor at a given location.

In spite of the prior efforts at developing improved fluid level indicators, there remains a need in the art, and especially in the automotive arts, for an economical, reliable, easily utilized level indicator that will permit convenient intermittent checking of a fluid level without unnecessarily exposing the user to engine dirt and without adding an additional indicator to the already cluttered dashboards of modern automobiles. An improved level indicator with these qualities would have significant impact in improving the quality of auto maintenance by making periodic crankcase oil level monitoring a far less troublesome chore than it has been heretofore.

DISCLOSURE OF THE INVENTION

In accordance with the present invention, a novel and improved fluid level indicating apparatus is provided to give indication of a reservoir fluid level. The apparatus may preferably be supported in the fill pipe or tube which is utilized to add fluid to the reservoir, and a hinged fill pipe cover element may provide a pivoting actuator function that imparts pivotal motion to a fluid level indicating element. The indicating element of the level indicating system preferably is a pivotably disposed indicator plate that pivots on a common axis with the pivoting actuator element and is selectively releasably connected thereto by a spring tension friction clamp element. The indicator plate pivots with respect to a fixed pointer that registers with a series of fluid level indicia on the indicator plate. Another element, preferably a part of the pointer, bears against the indicator plate to provide a frictional grip thereon for support of the indicator plate when not being forceably moved. Additionally, the indicator plate may be provided with a groove means or the like (e.g. embossed level indicating indicia) which cooperates with the pointer or the means for the purpose of providing audible signals corresponding to increments of fluid level as the indicator plate is pivotably moved.

Further in accordance with the invention, the indicator plate is attached to a pivotal link which extends down the fill tube and into the fluid reservoir. There, the lower end of the link is fixedly secured to a piston that is slidably disposed within the bore of a cylinder, which cylinder is secured at a fixed, predetermined elevation within the fluid reservoir. The cylinder has openings which allow fluid to fill the cylinder to the same level as in the reservoir such that the cylinder volume between the piston and its upper, closed end typically will be at least partially filled with fluid.

The piston and cylinder assembly also is provided with a small opening, preferably in the upper closed end of the cylinder, that is sized to vent air from the cylinder while substantially restricting fluid flow therefrom. Thus, the piston typically will be free to move vertically upward toward the upper closed end of the cylinder until the remaining cylinder volume therebetween is equal to the volume of oil in the cylinder bore prior to piston movement. Accordingly, the level of fluid in the reservoir may be indicated directly by a given magnitude of piston movement upward from a uniform starting position to a position where fluid flow resistance is first met. The connecting link translates any such given magnitude of piston movement into a corresponding magnitude of indicator plate rotation so that the pointer position may be calibrated to the indicator plate indicia and thereby directly indicate the fluid level in the reservoir. Of course, the operating impetus which moves the piston is provided by rotary impetus manually applied to the indicator plate, as by the above-mentioned rotary actuator element, and transmitted via the connecting link to the piston.

The invention thus offers a reliable, economical apparatus for direct indication of a reservoir fluid level in a simple mechanical apparatus without resort to conventional dip stick type indicators or the like, and without need of more expensive electrically powered, continuous monitoring systems.

The invention will be more fully appreciated upon consideration of the following detailed description.

DETAILED DESCRIPTION OF THE DRAWINGS

The invention is described hereinbelow with reference to the accompanying drawings, in which.

BEST MODE FOR CARRYING OUT THE INVENTION

Figure 1:
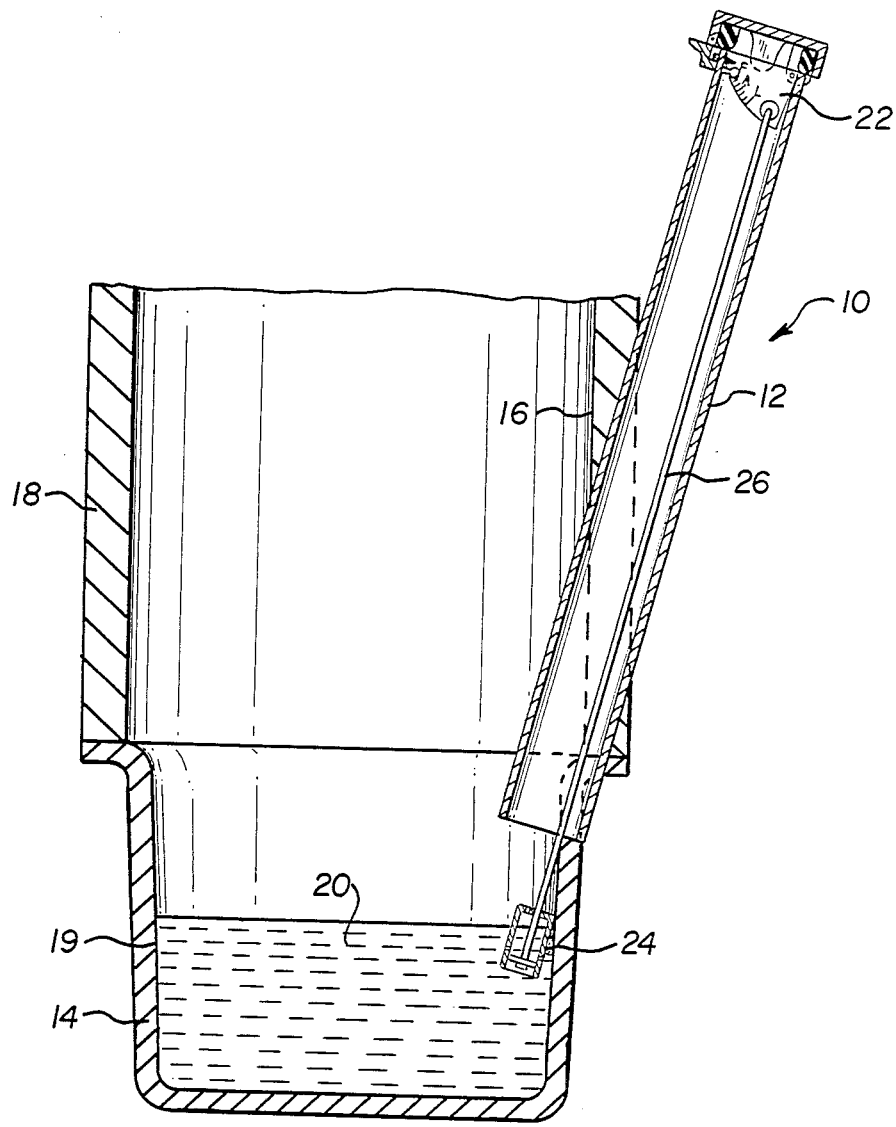
FIG. 1 is a sectioned side elevation of a reservoir having installed therein a level indicating apparatus according to the present invention.

The principles of this invention are disclosed by way of example in a fluid level indicating apparatus 10 as shown in FIG. 1. For purposes of description, the fluid level indicating apparatus 10 is disclosed herein as being adapted for use in conjunction with the conventional oil filled crankcase of an internal combustion engine such as that of an automotive vehicle. However, it is to be appreciated that a fluid level indicating apparatus in accordance with the present invention may also be utilized with other types of fluids and reservoirs to provide indication of the fluid level in the reservoir of interest.

Fluid level indicating apparatus 10 is disposed within the crankcase fill pipe 12 which extends from the engine crankcase 14 upwardly alongside the engine block 16 of an internal combustion engine 18 partially shown. Fill pipe 12 may be straight or generally curvilinear to conform to the space limitations around engine 18. The crankcase 14 is adapted as a reservoir 19 to contain a volume of lubricating oil 20. In FIG. 1 the level of oil 20 in reservoir 19 is depicted as an intermediate fluid level between a "full" level and an inadequate level. That is, at some fluid level higher than that shown in FIG. 1, the crankcase is considered to be full, and at some fluid level lower than that shown in FIG. 1, the crankcase oil level is considered to be "low", i.e. inadequate for further engine operation without first adding oil. Indicator 10, as hereinbelow described, is adapted to render fluid level indications within this range of levels.

Figures 2, 3:
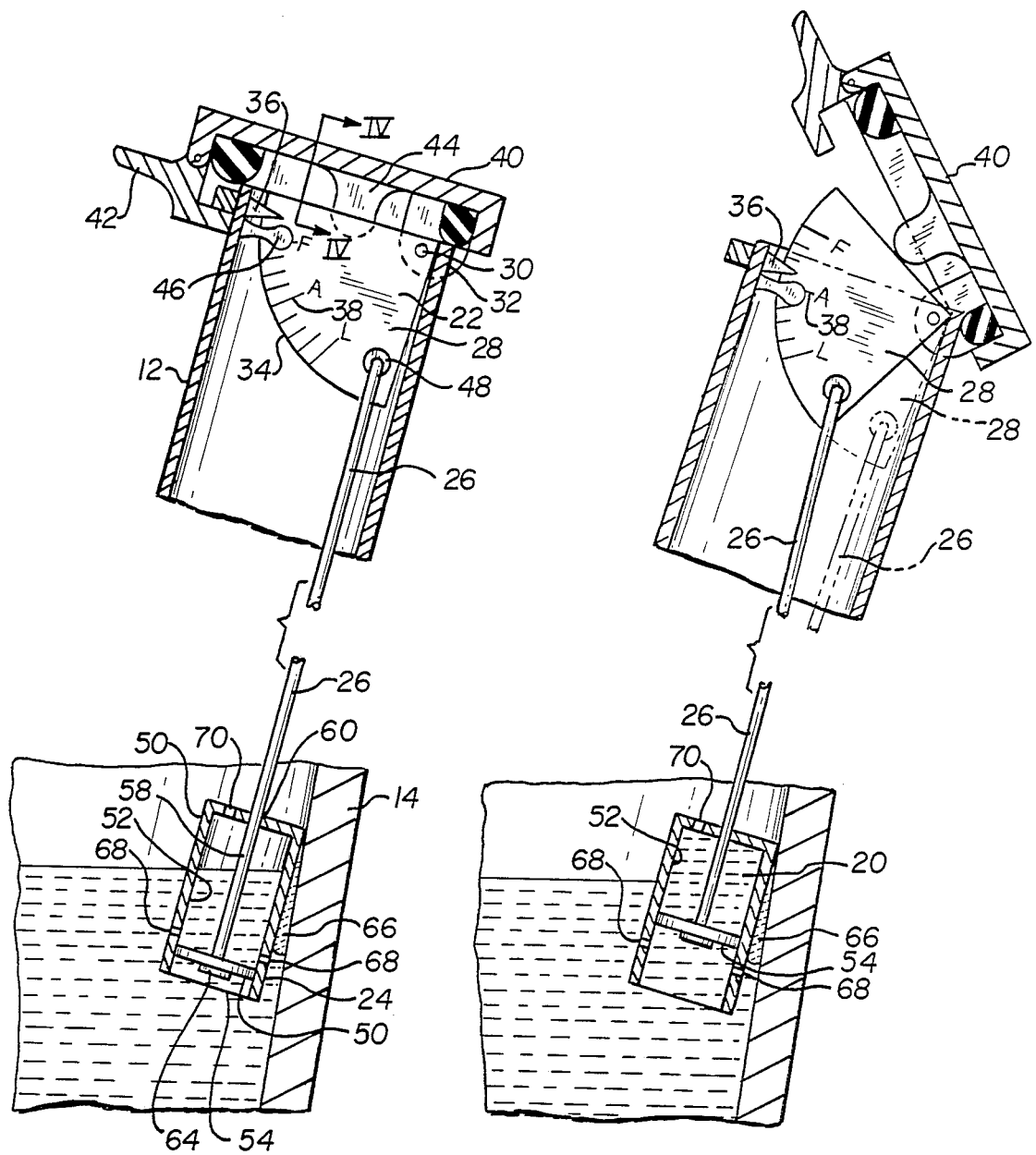
FIG. 2 is a sectioned side elevation of operative portions of the level indicating apparatus shown in an initial or non-indicating condition.
FIG. 3 is a sectioned side elevation similar to FIG. 2 showing the level indicating apparatus in a level indicating mode or condition.

Referring to FIGS. 1 and 2, level indicating apparatus 10 comprises an upper or indicator end portion 22 disposed adjacent the open-end of oil fill pipe 12, a lower end portion 24 preferably disposed in reservoir 19 in predetermined relationship with respect to the range of oil levels therein to be detected and indicated, and an elongated, interconnecting link member 26 which extends intermediate portions 22 and 24 within oil fill pipe 12.

Indicator end portion 22 comprises a generally quadrant shaped indicator plate 28 which is pivotally connected as by a pivot pin 30 within the upper end 32 of fill pipe 12 for pivotal movement therein. An arcuate edge 34 of plate 28 registers with a fixed pointer 36 during pivotal movement of plate 28 whereby oil level indicia 38 on plate 28 register with pointer 36 according to the relative pivotal position of plate 28 with respect thereto.

A rotary actuator element 40, for example a hinged closure or cap for fill pipe 12, is also retained by pivot pin 30 for pivotal movement independently of plate 28. Cap 40 may also preferably include a suitable latch for positive closure thereof such as a spring loaded thumb latch 42.

Figure 4:
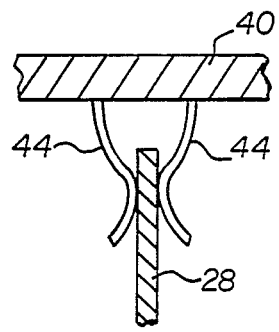
FIG. 4 is a fragmentary detail view taken on line IV—IV of FIG. 2.

As shown in FIG. 2, when cap 40 is closed, level indicating apparatus 10 is confined entirely within the closed fill pipe 12 and plate 28 is in its lowermost pivotal position. A pair of spring biased fingers 44 are secured to the underside of cap 40 and project downwardly therefrom to straddle plate 28 and frictionally grip same by virtue of the spring bias between the fingers 44, (FIG. 4). Accordingly, upon the release of latch 42 and pivotal opening of cap 40, the frictional grip of fingers 44 on plate 28 will impart concomitant pivotal motion to plate 28 until resistance to further pivotal motion thereof causes fingers 44 to separate therefrom, as will be described hereinbelow. Upon such separation of fingers 44 from plate 28, an entirely similar set of spring biased fingers 46 serve to retain plate 28 in the exact pivotal position at which such resistance was encountered. The fingers 46 preferably straddle plate 28 for spring biased engagement with opposite sides thereof at a frictional force level less than that applied by fingers 44. The spring biased fingers 46 may be fixedly secured within the upper end of fill pipe 12, for example directly subjacent to pointer 36 as shown. A through aperture 48 in plate 28 pivotally receives one end of link 26 such that upon opening of cap 40 and resultant pivotal movement of plate 28, link 26 is pulled upward within fill pipe 12.

Also as shown in FIG. 2, actuator end portion 24 comprises a cylinder member 50 having a blind bore 52 extending therein from a lower open end 54 thereof. A piston 56 is axially slidable within bore 52 under the impetus of axial motion transmitted via link 26 as above described. Accordingly, a lowermost end portion 58 of link 26 extends in sealed sliding relationship through a bore 60 formed coaxially of cylinder 50 in the upper closed end 62 thereof. The end portion 58 of link 26 is secured to piston 54 as at 64 to thereby function as a piston rod for the piston 54. Of course, piston 54 may be provided with a suitable rod other than an end portion of link 26 so long as link 26 is suitably connected thereto to impart axial motion to the rod and piston assembly.

Cylinder 50 preferably is rigidly located within reservoir 19 as by being secured by weldment 66 to an interior sidewall portion of crankcase 14. Alternative securing arrangements may include any other suitable means for retaining cylinder 50 rigidly with respect to crankcase 14. Also contemplated is the alternative of structuring the entire indicator apparatus 10 as a unit for installation in fill pipe 12 and securing thereof in fill pipe 12 by any suitable means adjacent the upper open end thereof. In such an embodiment, supporting structure for cylinder 50 to support same with respect to plate 28 would extend within fill pipe 12 between indicator end portion 22 and actuator end portion 24 of the apparatus 10.

In any event, it is imperative that cylinder 50 be located at a fixed elevation with respect to the level of oil to be maintained within crankcase 14. The requisite elevation of cylinder 50 in this regard will be apparent from the description hereinbelow of operation of the invention.

As further shown in FIG. 2, the piston and cylinder assembly also includes one or more fluid inlet ports 68 spaced from the upper closed end 62 thereof, and a vent port 70 formed in upper closed end 62. Ports 68 are located above the location of piston 54 in the initial or non-indicating position thereof. Accordingly, oil in reservoir 19 is free to flow via ports 68 into cylinder bore 52 to seek a common level with the level of oil in the reservoir 19. To accommodate this inflow of oil, air is vented from cylinder bore 52 via vent port 70 to the space above the oil level within reservoir 19.

It is to be noted that port 70 is suitably sized to permit venting of air from cylinder bore 52 at a predetermined minimal pressure drop, and also to present substantial restriction to passage of oil therethrough. The differential flow resistance between passage of air and passage of oil through port 70 constitutes the threshhold of flow resistance which determines the limit of pivotal movement for plate 28 upon opening of cap 40, and therefore it also determines the position of indicia 38 with respect to pointer 36 upon release of plate 28 from fingers 44.

The manner of operation of apparatus 10 will be readily understood from the following description. When cap 40 is closed, indicator plate 28 is in its lowered or non-indicating position as has been hereinabove explained. Connecting link 26 and piston 54 are also in their lowermost positions such that oil from reservoir 19 is free to flow via the ports 68 into cylinder bore 52 to seek the same level as the oil in the reservoir. As mentioned, the venting of air from cylinder bore 52 via port 70 accommodates this inflow of oil into cylinder 50. To check the level in reservoir 19, the cap 40 is opened by first releasing latch 42 and pivoting the cap 40 upward about pivot pin 30 in one continuous sweeping motion. The lifting of cap 40 also serves to lift indicator plate 28 due to the biased friction grip of fingers 44 on plate 28. This also lifts piston 54 through the action of the connecting link 26. As piston 54 passes inlet port 68, the oil within cylinder bore 52 above piston 54 is trapped. The volume of the trapped oil is related directly to the initial oil level within cylinder bore 52, and therefore is also directly related to the level of oil in reservoir 19. Continued lifting of cap 40 correspondingly raises piston 54 toward closed end 62. During this phase of operation, air in cylinder bore 52 above the trapped oil volume is being vented via port 70 to the air space above the oil in crankcase 14.

As noted above, the size of port 70 is selected to provide some definite minimal pressure drop and a corresponding increment of air compression within cylinder bore 52 to provide a small but noticeable resistance to the motion of cap 40 and the connected mechanism as above described. Depending on the volume of oil trapped within cylinder bore 52, all air will be entirely expelled from cylinder bore 52 at some point in the upward travel of piston 52, at which point further motion would force oil flow through port 70. At this juncture, the pressure drop for fluid flow through port 70 will increase dramatically due to the different flow characteristics as between air and oil. Consequently, a substantial resistance to further movement of cap 40 and the rest of the operating mechanism as described is abruptly introduced. Under these conditions, continued pivoting of cap 40 in the open direction will overcome the bias of fingers 44 and the fingers 44 will thus disengage from indicator plate 28. The position of indicator plate 28 at which this event occurs is directly related to the level of oil within reservoir 19. As the cap 40 is further opened the indicator plate 28 is left at a position corresponding to reservoir oil level and retained there by the grip of spring biased fingers 46. The pointer 36 therefore indicates by registry with the indicia 38, the condition of oil level in reservoir 19. It is necessary only to calibrate the location of the indicia 38 on plate 28, and/or the position of pointer 36, to correspond to the range of oil levels to be indicated. For example, in FIG. 3 cylinder bore 52 above piston 54 is solid with oil 20, and cap 40 has separated from plate 28 with the plate 28 in a position indicating an oil level somewhat less than full (F) but slightly more than level A, the level for which addition of one unit of oil (e.g., one quart) is recommended. Were the oil level in reservoir 19 even lower, the volume of trapped oil in cylinder bore 52 above piston 54 would be less, and the piston therefore would be permitted to travel further, thus allowing plate 28 to rotate further before the imposition of the flow resistance which causes fingers 44 to separate from plate 28. The pointer might then register with the low level (L) indicia to indicate an urgent need for addition of two units of oil (e.g., two quarts) and to serve as a warning that a low level limit for operation of the engine has been reached.

As will be clear from the foregoing description, operation of the invention is purely mechanical, requiring only coordinated placement of cylinder 50 (with respect to the range of fluid levels to be indicated) and coordinated placement or positioning of pointer 36 and/or indicia 38 on plate 28, to afford a highly reliable, easy way to indicate the crankcase oil level for internal combustion engines or for other fluids confined in other types of reservoirs.

In addition to the visual indication of oil level afforded by the invention as above described, an audible fluid level indicating features may be incorporated in the invention by providing, in conjunction with pointer 36 and/or fingers 46, a suitable flexible contact element which bears upon one side or edge 34 of plate 28 to override in sequence a series of projections or indentations formed on the indicator plate 28 and thereby project an audible signal (e.g. a clicking sound) as plate 28 pivots with cap 40. For example, the projection may be the tip of pointer 36 and the cooperating projections or indentations on indicator plate 28 may be the indicia 34 embossed thereon. Each audible click will corresponding to a predetermined quantity of oil volume below the desired full level F. By counting the number of audible clicks, one could accurately determine, even without visual reference, the oil level within crankcase 19.

In view of the above description, it will be understood that the invention is susceptible of various modified and alternative embodiments apart from the described presently preferred best mode of the invention. As I have contemplated such alternative and modified embodiments, and surely such would also occur to others versed in the art, once apprised of my invention, it is my intent that the invention be construed as broadly as permitted by the scope of the claims appended hereto.

The embodiments of the invention in which an exclusive property or privilege as claimed are defined as follows:

1. In an indicating apparatus for giving indication of the level of fluid contained in a reservoir, the indicating apparatus comprising:
   a support means having a portion spaced from said reservoir and connected thereto;
   an indicator means mounted to said support means portion spaced from said reservoir;
   said indicator means including indicia thereon corresponding to a range of fluid levels to be indicated;
   a registering means mounted on said support means portion and positioned for registry with said indicia on said indictor means;
   said indicator means being movably mounted on said support means with respect to said registering means to permit registry of said registering means with said indicia in a range of relative positions corresponding to said range of fluid levels to be indicated;
   an actuating means gripable by a user and releasably mounted to said indicator means through a releasable retention means to draw said indicator means from an initial position thereof through a range of available motion and to release said movable indicator means when said indicator means encounters a predetermined resistance to further motion;
   a chamber element having a portion in which there is defined a variable volume chamber that is adapted to be maintained at least partially submerged in the fluid contained within said reservoir;
   a piston means movably disposed within said chamber for decreasing the volume of said chamber by a movement thereof from an initial position corresponding to said initial position of said indicator means; link means connecting said piston means and said indicator means;
   said chamber element including at least one inlet port communicating between said chamber and said reservoir when said piston means is in said initial position;
   said inlet port being submerged in the reservoir fluid to permit reservoir fluid to flow into said chamber when said chamber is submerged in the reservoir fluid sufficiently for fluid level indication;
   said chamber element including at least one vent port located to vent gas first, and fluid subsequently, from said chamber during piston movement to decrease the volume of said chamber;
   said vent port being of a geometry to restrict fluid flow therethrough to generate at least said predetermined resistance when all air has been expelled from said cylinder through said vent port such that said releasable retention means is effective to retain said movable indicator means during movement of said actuating means only until concomitant movement of said piston means within said chamber encounters the fluid flow resistance imparted by the restriction of fluid flow through said vent port; and
   holding means cooperable with said indicator means to hold said indicator means at a relative position at which said actuating means is released from said indicator means in response to said piston means encountering said fluid flow resistance.

2. The indicating apparatus as claimed in claim 1 wherein said chamber is a blind cylinder bore having said piston means slidably disposed therein.

3. The indicating apparatus as claimed in claim 2 wherein said vent port communicates between said chamber and an exterior of said chamber element through the closed end of said blind bore.

4. The indicating apparatus as claimed in claim 3 wherein said inlet port is spaced from said closed end of said blind bore.

5. The indicating apparatus as claimed in claim 4 wherein an axis of said blind bore is oriented generally vertically within said reservoir.

6. The indicating apparatus as claimed in claim 1 wherein said indicator means is an indicator plate pivotably mounted to said support means portion.

7. The indicating apparatus as claimed in claim 6 wherein said actuating means is pivotally mounted co-axially with said indicator plate to said support means portion.

8. The indicating apparatus as claimed in claim 7 wherein said releasable retention means includes spring biased clip means located to engage opposite sides of said indicator plate in biased frictional engagement therewith.

9. The indicating apparatus as claimed in claim 8 wherein said actuator means is a cover means for an access opening to said reservoir, said access opening being a part of said support means.

10. An apparatus for indicating the level of fluid in a reservoir comprising:
    a cylinder member fixed in said reservoir and having a cylinder bore that is adapted to be at least partially submerged in a generally upright orientation within the fluid in said reservoir, said cylinder member having means to permit fluid to enter said cylinder;
    a piston axially movable within said cylinder bore upward from an initial position thereof;
    a support means;
    an indicator plate pivotably mounted on said support means and movable through a range of pivotable motion from an initial position thereof corresponding to said initial position of said piston remote from said cylinder;
    actuator means for gripping by a user; means for releasably securing said actuator means to said indicator plate so as to secure said actuator means and indicator plate together when tensile forces between said actuator means and said indicator plate are below a predetermined level and to release said actuator means and indicator plate when tensile forces between said actuator means indicator plate are above the predetermined level;
    connecting link means connecting said indicator plate to said piston to move said piston from said initial position thereof through a corresponding range of axial motion in said cylinder concomitantly with said pivotal motion of said indicator plate from said initial position thereof; and said cylinder including means to permit escape of gas and fluid from said cylinder upon movement of said piston within said cylinder upward from said initial piston position to provide a first level of resistance to movement of said piston in said cylinder below said predetermined tensile-force level when air is present in said cylinder and a second level of resistance above said predetermined tensile-force level when all air has been expelled from said cylinder whereby said retention means releases said indicator plate when said second level of resistance is encountered by said piston during axial movement thereof and the pivotal position of said indicator plate, when released, indicates the level of fluid in the reservoir.

11. In a fluid-level indicating apparatus wherein a level indicator is concomitantly movable with a fluid-level sensing element to indicate the level of fluid in a reservoir; an actuator element is coupled to the level indicator and is gripable by a user to move the level indicator to a position representative of the level of fluid in the reservoir from a position representative of a full reservoir when the fluid in the reservoir is below a full level; the fluid-level sensing element providing a first relatively small level of resistance to movement of the level indicator upon movement of the level indicator up to the position representative of the level of fluid in the reservoir, and a second, significantly higher level of resistance to movement of the level indicator upon reaching the position representative of the level of fluid in the reservoir;

the improvement comprising:

means for releasably securing said actuator element to said level indicator so as to secure said actuator element and said level indicator together during said first level of resistance but to provide separation between said actuator element and said level indicator when said second higher level is encountered.

12. A fluid-level indicating apparatus according to claim 11 and further comprising means to retain said level indicator in a relatively fixed position when said actuator element separates from said level indicator.

* * * * *